United States Patent
Oda et al.

[11] Patent Number: 5,823,160
[45] Date of Patent: Oct. 20, 1998

[54] CONTROL APPARATUS FOR AN IN-CYLINDER INJECTION TYPE INTERNAL COMBUSTION ENGINE

[75] Inventors: Hideyuki Oda, Nagoya; Kenji Goto; Masayuki Miyamoto, both of Kyoto, all of Japan

[73] Assignee: Mitsubishi Jidosha Kogyo Kabushiki Kaisha, Tokyo, Japan

[21] Appl. No.: 990,324

[22] Filed: Dec. 11, 1997

[30] Foreign Application Priority Data

Dec. 13, 1996 [JP] Japan ................................. 8-334155

[51] Int. Cl.$^6$ .......................... F02M 35/10; F02B 17/00
[52] U.S. Cl. ................. 123/295; 123/184.55; 123/305
[58] Field of Search ........................ 123/184.55, 295, 123/305

[56] References Cited

U.S. PATENT DOCUMENTS

| | | | |
|---|---|---|---|
| 4,890,586 | 1/1990 | Fujii et al. ........................ | 123/184.55 |
| 4,932,369 | 6/1990 | Parr ...................................... | 123/184.55 |
| 5,438,964 | 8/1995 | Breidenbach ...................... | 123/184.55 |

*Primary Examiner*—Erick R. Solis

[57] ABSTRACT

A control apparatus for an in-cylinder injection type internal combustion engine includes an electronic control unit and an induction control system for changing the effective length of an intake passage of an induction system of the engine. The electronic control unit selects one of fuel injection modes including a compression-stroke injection mode and an intake-stroke injection mode in accordance with the engine operating state. When the engine is operated in a low engine-speed zone of a compression-stroke injection region, the electronic control unit controls the induction control system so as to make the effective length of the intake passage shorter than that for other engine operating region, to thereby attain a stable combustion, improved fuel efficiency and improved engine output in any fuel injection mode.

4 Claims, 4 Drawing Sheets

FIG. 4

CONTROL APPARATUS FOR AN IN-CYLINDER INJECTION TYPE INTERNAL COMBUSTION ENGINE

BACKGROUND OF THE INVENTION

1. Technical Field of the Invention

The present invention relates to an in-cylinder injection type internal combustion engine, and more particularly, to a control apparatus for an engine of this type which apparatus improves the fuel consumption and output of the engine with the aid of an induction control system.

2. Description of the Related Art

A spark-ignition type multi-cylinder internal combustion engine is provided with an induction system comprising an intake pipe in which a throttle valve is disposed and an intake manifold through which the intake air supplied from the intake pipe is distributed to respective cylinders of the engine. The vertical motions of pistons in the cylinders and the opening/closing actions of intake valves cause the air pressure in the induction system to periodically vary.

If a positive pressure wave caused by the pressure pulsation reaches an intake valve which is open, the introduction of intake air into a cylinder through the intake valve is promoted. Thus, the pulsating intake air produces a supercharging effect. If a negative pressure wave, generated when the intake valve for a given cylinder was opened, reaches the intake valve of a different cylinder, the introduction of intake air into the latter cylinder is suppressed. That is, the induction interference between cylinders takes place. Moreover, the intake air acquires inertia while being transferred to a cylinder. The inertial induction produces a supercharging effect. The inertia of intake air increases with the increase in engine speed and in intake pipe length.

In view of the above, the induction system is designed to improve the induction efficiency. In order to reduce the induction interference, a surge tank is provided between the intake pipe and the intake manifold. The induction system is configured to attain the supercharging effect of inertial induction and pulsating induction. However, an optimum length of the intake pipe for attainment of the supercharging effect varies depending on engine speed, whereas the intake pipe usually has a fixed length. Thus, it is difficult to attain the supercharging effect over the entire engine speed region.

In this regard, various induction control systems for changing the intake pipe length depending on the engine operating state have been proposed. For example, an induction control system is known which changes the effective length of the intake manifold in two stages, by opening and closing an induction control valve to cause the effective-length increasing function of a detour induction passage, interposed between upstream portion and downstream portion of the intake manifold, to be selectively effective. This system closes the induction control valve to cause the intake air to flow from the upstream portion into the downstream portion of the intake manifold by way of the detour induction passage when the engine is in a low-speed region, and opens the valve to cause the air to bypass the detour passage so that the air flows directly into the downstream portion of the intake manifold. By changing the effective pipe length depending on the engine speed in this manner, the induction efficiency can be improved over the entire engine speed region.

For spark-ignition type internal combustion engines, various in-cylinder injection type gasoline engines have been proposed which directly inject fuel into a combustion chamber, unlike conventional intake-manifold injection type engines. A typical in-cylinder injection type engine is arranged to inject fuel from a fuel injection valve into a cavity formed in the top of a piston of the engine when the engine is in a low-load region, to thereby form a substantially stoichiometric mixture around an ignition plug at ignition timing and form a lean mixture around the substantially stoichiometric mixture. If such a stratified charging is achieved by performing the fuel injection in the compression-stroke injection mode (second-term injection mode), a lean air-fuel mixture whose air-fuel ratio is lean when observed over the entire of the cylinder is enabled to be burnt, the emission of harmful exhaust-gas components is reduced, and the fuel consumption is greatly improved. When the engine is in a medium- or high-load region, fuel is injected in the intake stroke to form a stoichiometric or rich mixture uniformly in the cylinder, thereby obtaining a desired engine output while preventing an overrich misfire.

In order to stabilize the stratified charging for stable stratified combustion in the compression-stroke injection mode, some technical idea must be put into in designing the engine. For example, a technique of generating a circling flow (e.g., a so-called tumble flow or swirl flow) of intake air in a cavity formed in the top of a piston is proposed, whereby a substantially stoichiometric air-fuel mixture is retained in the cavity under the action of the circling flow of intake air.

SUMMARY OF THE INVENTION

In order to further improve the fuel consumption and output of an in-cylinder injection type internal combustion engine, the present inventors attempted to utilize an induction control system. According to experiments, it was found that a stabilized combustion could not be achieved depending on a combination of fuel injection mode of the engine and an operating mode (effective intake pipe length) of the induction control system. For instance, if the effective pipe length was made long at the time of engine operation in the compression-stroke injection mode, a stable combustion could not be attained. According to the knowledge of the present inventors, in order to obtain a stable combustion when the engine is operated in the compression-stroke injection mode, a strong circling flow of intake air must be generated to increase the degree of stratified charging (stratified degree of charging). It is considered that the reason why the combustion cannot be stabilized in the case of using the intake pipe of the long effective length resides in that the circling flow strong enough to attain a desired degree of stratified charging cannot be generated. The strength of circling flow is represented, e.g., by a circling flow ratio (which is a ratio of the rotational speed of circling flow to the engine rotational speed). The strength of circling flow becomes greater as the circling flow ratio increases. Meanwhile, in the intake-stroke injection mode (first-term injection mode) selected when the engine is operated at a medium- or heavy load region, the circling flow enhances the uniformity of air-fuel mixture in the cylinder, but the strength of the circling flow does not greatly affect the stability of combustion.

An object of the present invention is to provide a control apparatus for an in-cylinder injection type internal combustion engine, which apparatus can improve the fuel consumption and output of the engine with the aid of an induction control system.

According to the present invention, there is provided a control apparatus of an in-cylinder injection type internal combustion engine which is selectively operated in at least either a compression-stroke injection mode where fuel is injected in a compression stroke or an intake-stroke injection mode where the fuel is injected in an intake stroke of the engine.

The control apparatus of this invention comprises an induction control system for changing an effective length of an intake passage through which air is introduced into a combustion chamber of the engine, and intake-passage length control means for operating the induction control system to change the effective length of the intake passage in accordance with the selected injection mode. In the compression-stroke injection mode, the induction control system operates under control of the intake-passage length control means to make the effective length of the intake passage shorter than that for the intake-stroke injection mode.

The present invention is advantageous in that a stable combustion can be attained in an in-cylinder injection type internal combustion engine with the aid of the effective intake-passage length changing function of the induction control system, to thereby improve the fuel consumption and output of the engine. Especially, the present invention makes it possible to shorten the effective intake-passage length to thereby generate a strong circling flow of intake air when the engine is operated in the compression-stroke injection mode. As a consequence, the stratified charging can be stabilized for stable stratified combustion.

For instance, in the case of using an induction control system provided with a detour induction passage which has a considerable length for the passage length adjustment and a complicated shape for avoiding interference with peripheral components, the circling flow of intake air strong enough to attain a desired degree of stratified charging cannot be generated in the cylinder, if the intake air is sucked into the engine by way of the detour induction passage when the engine is operated in the compression-stroke injection mode. According to the present invention, the detour induction passage can be short-circuited at the time of engine operation in the compression-stroke injection mode, whereby the circling flow of intake air having a desired strength can be generated. As a consequence, a desired degree of stratified charging can be attained, thereby permitting a stable combustion. A similar advantage can be attained in the case of using an induction control system of the other type.

In the present invention, preferably, the control apparatus further comprises operating state detecting mean for detecting an engine operating state. The induction control system operates under the control of the intake-passage length control means to change the effective length of the intake passage in accordance with the engine operating state detected by the operating state detecting means.

With this preferred arrangement, the intake passage length (intake pipe length) can be optimized depending on the engine operating state, whereby the supercharging effect of inertial induction suitable for the engine operating state can be attained, thereby improving the induction efficiency.

More preferably, an amount of change in the effective length of the intake passage in the compression-stroke injection mode is set to a value of zero or less than that in the intake-stroke injection mode.

With this preferred arrangement, the air flow in the intake pipe can be made smooth by making the amount of change in the intake passage length small or equal to zero, whereby a strong circling flow of intake air can be generated in the cylinder. In the intake-stroke injection mode, the intake passage length can be changed greatly as compared to that in the compression-stroke injection mode, thereby attaining an improved induction efficiency suitable for the engine operating state. As a result, the induction efficiency can be improved over the entire engine operating region, while maintaining a proper combustion state.

In the present invention, preferably, the control apparatus further comprises load-related value detecting means for detecting a load-related value which interrelates with engine load. The intake-stroke injection mode is comprised, at least, of an enrich mode where the engine is operated with an air-fuel ratio which is richer than a stoichiometric air-fuel ratio and a stoichiometric air-fuel mode where the engine is operated with an air-fuel ratio equal to or close to the stoichiometric air-fuel ratio. In case that the enrich mode or the stoichiometric air-fuel ratio mode is selected, if the engine rotational speed is equal to or lower than a predetermined speed and if the load-related value is equal to or greater than a predetermined value, the effective length of the intake passage is set to a length longer than that for the compression-stroke injection mode.

With this preferred arrangement, when the engine operates in a middle-speed, heavy-load region under the condition that the enrich mode or the stoichiometric air-fuel ratio mode is selected, the intake passage length can be made long. As a consequence, the induction efficiency can be improved by means of the supercharging effect of inertial induction, so that the engine output increases.

DETAILED DESCRIPTION

A spark-ignition, in-cylinder injection type internal combustion engine on which a control apparatus according to a first embodiment of this invention is mounted will be explained.

Figure 1:
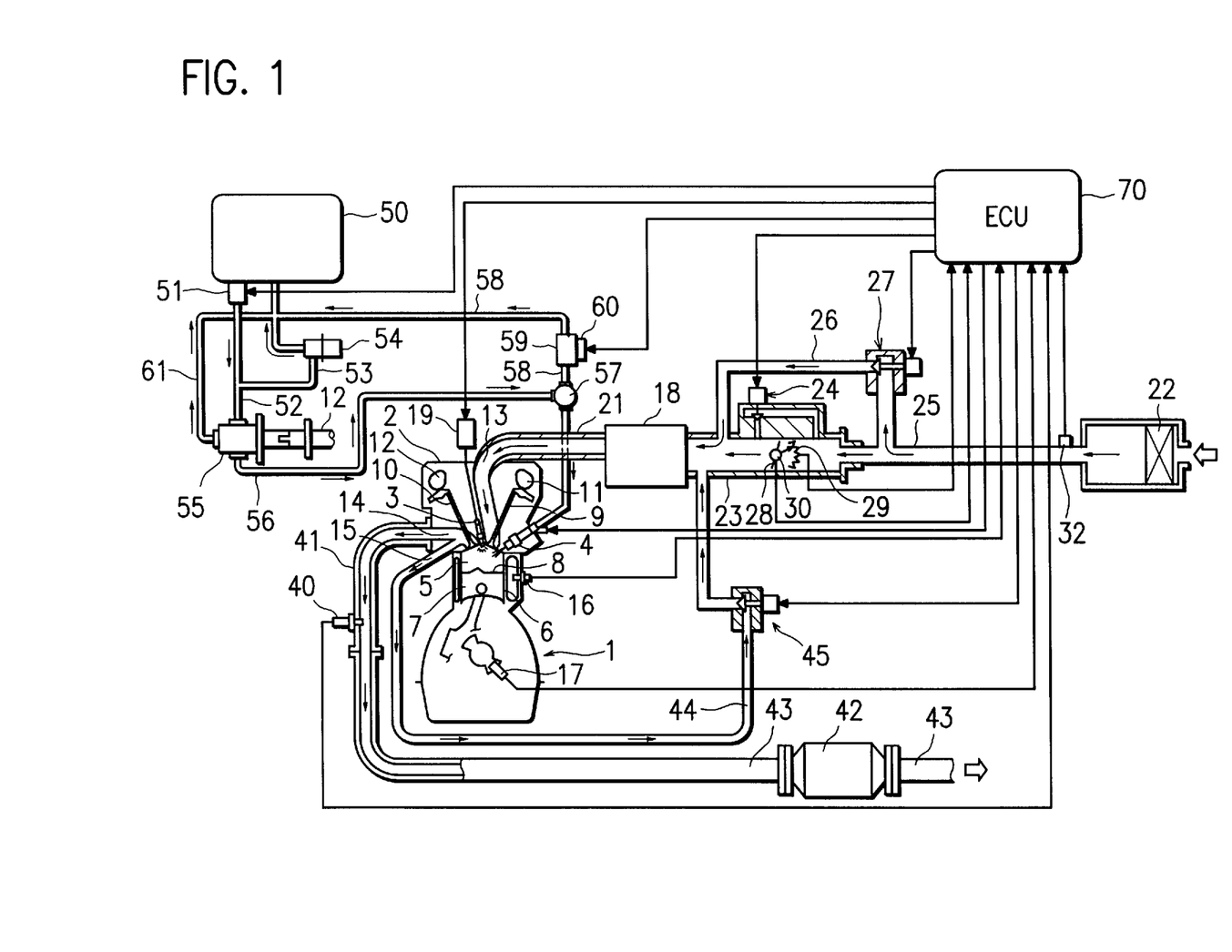
FIG. 1 is a schematic view of an in-cylinder injection type internal combustion engine equipped with a control apparatus according to a first embodiment of the present invention.

Referring to FIG. 1, the engine 1 has a cylinder head 2 thereof fitted with a spark plug 3 and an electromagnetic fuel injection valve 4 for each cylinder, so that fuel may be injected from the fuel injection valve 4 directly into a combustion chamber 5 concerned. A hemispherical cavity 8 is formed in the top surface of a piston 7 disposed in the cylinder 6 for reciprocal motion. The cavity is located at a position to which fuel spray can reach if the fuel is injected from the fuel injection valve 4 at timing in a latter stage of the compression stroke of the engine. The theoretical compression ratio of the engine 1 is set to a value (in this embodiment, approximately 12) higher than that of an intake-manifold injection type engine. A DOHC four-valve system is employed as a valve driving mechanism. Intake-side and exhaust-side camshafts 11 and 12 for driving intake and exhaust valves 9 and 10 are rotatably held at an upper portion of the cylinder head 2.

The cylinder head 2 is formed with intake ports 13 which extend substantially upright between the camshafts 11 and 12. Intake air flow having passed through the intake port 13 can generate a tumble flow in the combustion chamber 5. Exhaust ports 14 extend substantially in the horizontal direction, as in the case of those of ordinary engines. A large-diameter EGR port 15 diverges diagonally downward from the exhaust port concerned. The engine 1 is provided with a water temperature sensor 16 for detecting a cooling water temperature Tw, a crank angle sensor 17 for outputting a crank angle signal SGT at predetermined crank positions for each cylinder and for detecting the engine rotational speed Ne based on the crank angle signal SGT. Further, an ignition coil 19 for supplying a high voltage to the spark plug 3 is provided. One of the camshafts, which rotate at half the speed of the crankshaft, is fitted with a cylinder discriminating sensor (not shown) for outputting a cylinder discriminating signal SGC, whereby the cylinder for which the crank angle signal SGT is output is discriminated based on the sensor signal SGC.

The intake ports 13 are connected, through an intake manifold 21, with an intake pipe 25 which is provided with a throttle body 23, a first air bypass valve (#1ABV) 24 of a stepper-motor type serving as intake-air amount correction means, and an air cleaner 22. The intake pipe 25 is further provided with a large-diameter air bypass pipe 26 through which intake air is introduced, bypassing the throttle body 23, to the intake manifold 21 and in which a second air bypass valve (#2ABV) 27 of a large linear-solenoid type is disposed. The air bypass pipe 26 has a flow area substantially equal to that of the intake pipe 25, so that a quantity of intake air, required for engine operation in a low or medium speed region, can flow through the pipe 26 when the second air bypass valve 27 is fully open. The first air bypass valve 24 has a flow area smaller than that of the second air bypass valve 27 and is used to finely adjust the intake air amount.

The throttle body 23 is provided with a butterfly type throttle valve 28 for opening and closing the intake passage formed therein, a throttle position sensor 29 for detecting the throttle opening degree θth, and an idle switch 30 for detecting a fully-closed state of the throttle valve 28, i.e., an idle state of the engine. An intake air temperature sensor and an atmospheric pressure sensor (none of which is shown), for determining the density of intake air are disposed in the air cleaner 22. These sensors deliver output signals indicative of the atmospheric pressure and the intake air temperature, respectively. In the vicinity of the inlet of the intake pipe 25, a Karman's vortex type air flow sensor 32 is disposed and outputs a vortex occurrence signal which is proportional to the volumetric air flow rate Qa per intake stroke. Instead of the air flow sensor 32, a boost pressure sensor, not shown, for detecting the intake air pressure within the intake pipe 25 may be provided.

Figure 2:
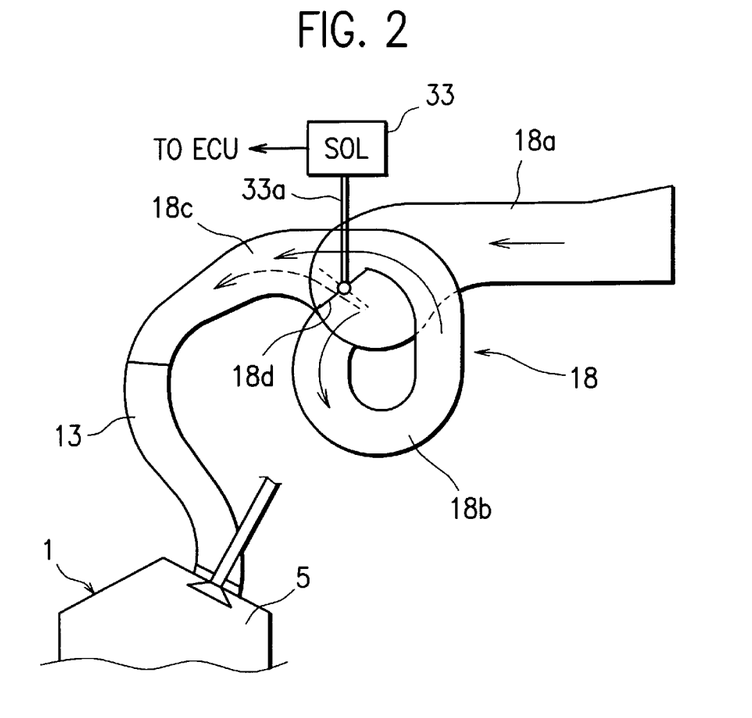
FIG. 2 is a schematic view showing an induction control system for use in the control apparatus of the first embodiment.

Referring to FIG. 2, the induction control system 18 of this embodiment is of an effective pipe-length changing type. The induction control system 18 includes a first induction pipe 18*a* which constitutes a downstream portion of the intake pipe 25. A downstream end portion of the first pipe 18*a* constitutes a surge tank. The first pipe 18*a* has a downstream end thereof connected with upstream ends of second induction pipes (detour pipes). One of the second pipes is denoted by reference numeral 18*b*. Sections where the pipes 18*a* and 18*b* are connected with each other are referred to as first communicating sections. At second communicating sections located adjacent to the first communicating sections, the downstream end of the first pipe 18*a* is connected with upstream ends of third induction pipes which cooperate with the second pipes 18*b* to constitute the intake manifold 21 whose effective length is variable. One of the third pipes is shown by reference numeral 18*c*. Induction control valves (one of which is shown by reference numeral 18*d*) for selectively permitting or prohibiting the communication between the first pipe 18*a* and the third pipes 18*c* are disposed at the second communication sections. At third communicating sections adjacent to the second communicating sections, the downstream ends of the second pipes 18*b* are connected to the upstream ends of the third pipes 18*c* whose downstream ends are connected to the upstream ends of the intake ports 13 for the respective cylinders of the engine 1.

The pipes 18*a*, 18*b* and 18*c* of the induction control system 18 are disposed so as not to interfere with various components disposed in the engine room of a vehicle on which the engine 1 is installed and with the bonnet hood of the vehicle. In addition to such a general requirement, the second pipes 18*b* must satisfy additional requirements such that they must be formed into a shape which permits their upstream and downstream ends to be connected with the downstream ends of the third pipes 18*c* and their lengths are long enough to exhibit the function of increasing the effective length of the intake manifold 21. As a consequence, each of the second pipes 18*b* has a considerable length, has a bent or curved shape as viewed in the lengthwise direction of the pipe 18*b*, and has a cross section which varies in shape at different lengthwise positions of the pipe 18*b*. Thus, the air receives a large resistance when it flows through the pipe 18*b*.

Especially, in a V-type engine having a so-called vertical intake port, there is a limited space between the upper portion of the engine and the bonnet hood, so that the induction control system is disposed between the right and left cylinder banks of the engine. In this case, the second pipe 18*b* must be formed into a further complicated shape where the cross-sectional area of the pipe greatly varies along its lengthwise direction. Meanwhile, the first and third pipes 18*a* and 18*c* are less likely to be bent and are hence small in change in its cross-sectional shape.

The induction control valve 18*d*, disposed at the second communicating section where the pipes 18*a* and 18*c* are connected with each other, is coupled to a movable rod 33*a* of a solenoid 33 through a coupling member such as a lever, not shown. The solenoid 33 includes an excitation coil electrically connected with the output side of an electric control unit (ECU) 70. The induction control valve 18*d* takes an ON position (shown by broken line in FIG. 2) where it permits the communication between the pipes 18*a* and 18*c* to be established when the excitation coil of the solenoid 33 is energized, and takes an OFF position (shown by solid line in FIG. 2) where it prohibits the communication therebetween when the excitation coil is de-energized, for instance.

When the induction control valve 18*d* is in the OFF position, the first pipe 18*a* is connected through the second pipe 18*b* with the third pipe 18*c*, so that the length of the intake manifold 21 (more generally, the length of the intake passage of the induction system) becomes long. The air supplied from the intake pipe 25 flows along the induction route constituted by the pipes 18*a*, 18*b* and 18*c*, as shown by solid arrow in FIG. 2. At this time, the flow of the air passing through the induction passage of the induction control system 18 is unsmoothed by a degree corresponding to the induction resistance of the second pipe 18b, so that the strength of the tumble air flow formed in the combustion chamber 5 is weakened. On the other hand, when the induction control valve 18d is at the ON position, the second pipe 18b is short-circuited, so that the first pipe 18a is connected directly with the third pipe 18c. As a consequence, the length of the intake manifold 21 is shortened, and a bend in the resultant induction passage defined in the intake manifold 21 is relatively lessened and hence a change in the cross-sectional area of this passage is relatively small. The intake air flows along the route comprised of the first and third pipes 18a and 18c, as shown by broken arrow in FIG. 2. The air flow passing through the induction passage defined at this time in the induction control system 18 is smoothed by a degree corresponding to the eliminated induction resistance of the second pipe 18b, so that the resultant tumble flow is strengthened.

The Exhaust ports 14 are connected, through an exhaust manifold 41 provided with an $O_2$ sensor 40, to an exhaust pipe 43 which is provided with a three way catalyst 42, a muffler (not shown) and the like. The aforementioned EGR ports 15 are connected to the downstream of the throttle valve 28 and the upstream of the intake manifold 21 through a large-diameter EGR pipe 44 in which a stepper-motor type EGR valve 45 is provided.

The fuel stored in a fuel tank 50 is sucked up by a motor-operated lowe-pressure fuel pump 51, and is supplied to the engine 1 through a low-pressure feed pipe 52. The pressure of the fuel in the low-pressure feed pipe 52 is adjusted to a relatively low pressure by a first fuel pressure regulator 54 interposed in the line of a return pipe 53. The fuel supplied toward the engine 1 is fed into each fuel injection valve 4 through a high-pressure feed pipe 56 and a delivery pipe 57 by means of a high-pressure fuel pump 55 attached to the cylinder head 2. The fuel pump 55 is driven by the camshaft 11 or 12 to generate a discharge pressure equal to or greater than 5 Ma to 7 Ma even when the engine 1 runs idle. The fuel pressure in the delivery pipe 57 is adjusted to a relatively high pressure by a second fuel pressure regulator 59 interposed in the line of a return pipe 58. A fuel pressure selector valve 60, attached to the second fuel pressure regulator 59, operates at its ON position to relieve the fuel, thereby lowering the fuel pressure in the delivery pipe 57. Part of fuel used to lubricate and cool the high-pressure fuel pump 55 is returned to the fuel tank 50 through a return pipe 61.

An electronic control unit (ECU) 70 provided in a passenger cabin of the vehicle includes an I/O unit, storage units (ROM, RAM, BURAM, etc.) used to store control program, control map and the like, central processing unit (CPU), timer counter, and the like. The ECU 70 conducts an overall control of the engine 1.

Various switches (not shown) for detecting the operating states of an air conditioner, power steering device, automatic transmission and the like which apply loads to the engine 1 when operated are connected to the input side of the ECU 70 which receives detection signals from these switches. In addition to the above-mentioned various sensors and switches, many switches and sensors (not shown) are connected to the input side of the ECU 70 the output side of which is connected to warning lights, pieces of equipment and the like.

In accordance with input signals supplied from the sensors and switches concerned, the ECU 70 determines fuel injection mode, fuel injection amount, fuel-injection termination timing, ignition timing, EGR gas introduction amount and the like, and then controls the fuel injection valves 4, the ignition coil 19, the EGR valve 45 and the like.

In the following, a brief explanation will be given as to an ordinary control of the engine 1.

When the driver turns the ignition key switch to an ON position, the ECU 70 turns the low-pressure fuel pump 51 and the fuel pressure switching valve 60 on, thereby supplying the fuel injection valves 4 with the fuel at low pressure since the high-pressure fuel pump 55 insufficiently operates at the time of cranking the engine 1.

When the driver turns the ignition key switch to a START position, the engine 1 is cranked by a self-starter, not shown, and at the same time the ECU 70 starts a fuel injection control. At this time, the ECU 70 selects the intake-stroke injection mode (first-term injection mode), and controls fuel injection to attain a relatively rich air-fuel ratio. The reason for doing this is that a fuel injection amount must be increased to ensure a sufficient amount of fuel which contributes to combustion since the rate of vaporization of fuel is low when the engine is in a cold state. Further, the ECU 70 closes the second air bypass valve 27 at the start of the engine, so that intake air is supplied into the combustion chamber 5 through the clearance between the throttle valve 28 and the peripheral wall of the intake pipe 25 and through the bypass passage where the first air bypass valve 24 is disposed.

When the engine 1 starts an idle operation after the engine starting is completed, the high-pressure fuel pump 55 initiates a rated discharge operation. In response to this, the ECU 70 turns off the fuel pressure selector valve 60, and supplies the fuel at high fuel pressure to the fuel injection valves 4. Until the engine cooling water temperature Tw is raised to a predetermined value, the ECU 70 selects the intake-stroke injection mode for fuel injection to secure a rich air-fuel ratio, and closes the second air bypass valve 27, just as at the time of the engine starting. The idle speed control that is based on the variation of the loads of auxiliary apparatuses, such as an air conditioner, is carried out by means of the first air bypass valve 24, as in the case of the manifold-injection type engine. When the activation of the $O_2$ sensor 40 is completed, the ECU 70 starts air-fuel ratio feedback control in accordance with the output voltage of the $O_2$ sensor 40, and the three-way catalyst 42 is permitted to remove harmful exhaust gas components. As described in the above, when the engine is cold, fuel injection control is effected substantially in the same manner as in the case of the manifold-injection engine. Control response and control accuracy are improved in the in-cylinder injection engine which is free from adherence of fuel drop to the wall of the intake manifold 21.

Figure 3:
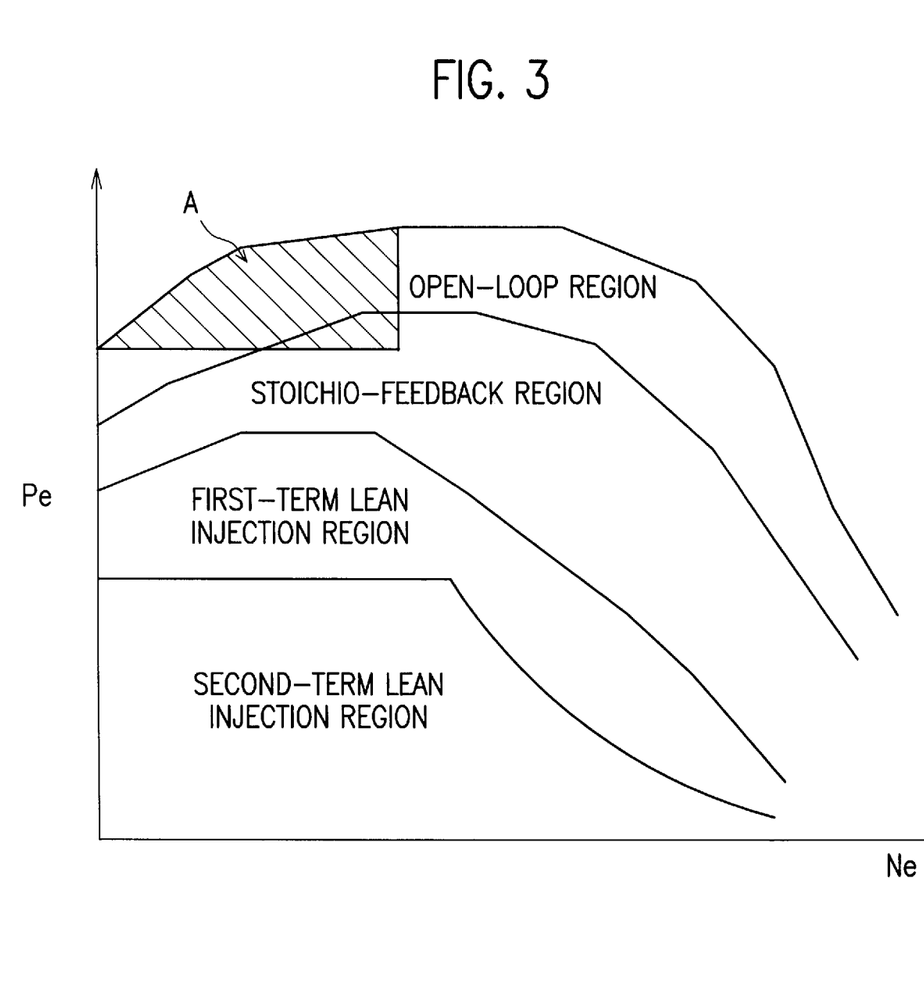
FIG. 3 is a map with which a fuel injection control of the engine shown in FIG. 1 is carried out.

When warming up the engine 1 is finished, the ECU 70 retrieves a present fuel injection control region from a fuel injection control map shown in FIG. 3 in accordance with the engine speed Ne and a target average effective pressure Pe which is obtained from the intake air amount Qa or throttle opening θth, etc. Then, the ECU 70 determines the fuel injection mode, fuel injection quantity, and fuel injection timing, and drives the fuel injection valves 4. Further, the ECU 70 controls the open-close operation of the first and second air bypass valves 24 and 27 and the EGR valves 45.

In a low-load, low-speed operating region for idle operation, etc., the engine is operated in a compression-stroke lean injection region (the second-term injection region), as shown in the map of FIG. 3, so that the ECU 70 selects a compression-stroke injection mode (second-term injection mode). The second air bypass valve 27 and the EGR valve 45 are opened, and the fuel is injected so as to obtain a lean average air-fuel ratio (e.g., about 30 to 40).

The intake air introduced into the combustion chamber through the intake port 13 generates a tumble flow, so that a fuel spray is kept in the cavity 8 of the piston 7 under the action of the tumble flow. As a result, an air-fuel mixture of an air-fuel ratio near the stoichiometric air-fuel ratio is formed in a layer around the spark plug 3 at the time of ignition, so that the fuel can catch fire even with a lean overall air-fuel ratio, whereby the emission of CO and HC can be reduced. The fuel consumption is largely improved in cooperation with the reduction of pumping loss. The idle speed control responsive to variations in the engine load caused by operations of the auxiliary apparatuses is carried out by increasing or decreasing the fuel injection quantity, so that control response is also very high. In this control region, the ECU 70 opens the EGR valve 45 to introduce a large amount (e.g., 30% or more) of EGR gas into the combustion chamber 5, thereby greatly reducing the emission of NOx.

In a medium-load region for constant-speed drive or the like, the engine is operated in an intake-stroke lean injection region (first-term injection region), a stoichiometric air-fuel ratio feedback region (stoichio-feedback region) or open-loop region shown in FIG. 3, depending on the engine load state and the engine speed Ne, so that the ECU 70 selects an intake-stroke injection mode (first-term injection mode), and injects the fuel so as to obtain a predetermined air-fuel ratio suitable for the respective region. More specifically, the respective opening degrees of the first and second air bypass valves 24 and 27 and the fuel injection quantity are controlled so as to obtain a relatively lean air-fuel ratio (e.g., about 20 to 23) in the intake-stroke lean injection region, with the EGR valve 45 kept closed. In the stoichio-feedback region, the air-fuel ratio feedback control is carried out in accordance with the output voltage of the $O_2$ sensor 40, with the opening degrees of the second air bypass valve 27 and the EGR valve 45 controlled by the ECU 70.

In the intake-stroke lean region, the fuel can be ignited even with a lean air-fuel ratio, due to the effect of a turbulence attributable to the tumble flow that is formed by the intake air flow introduced through the intake port 13. In the stoichio-feedback region, harmful exhaust-gas components are removed by the three-way catalyst 42. By controlling the EGR valve 45 so as to introduce a suitable amount of EGR gas into the combustion chamber 5, the emission of NOx can be reduced.

In a high-load region for sudden acceleration or high-speed drive, an open-loop region shown in FIG. 3 is reached, so that the ECU 70 selects the intake-stroke injection mode (enrich mode), closes the second air bypass valve 27, and injects the fuel so as to obtain a relatively rich air-fuel ratio (which is fuel-richer than the stoichiometric air-fuel ratio) in accordance with the intake air amount Qa or throttle opening θth, engine speed Ne, etc. Since a fuel-cut region shown in FIG. 3 is reached when the vehicle is coasting in a medium- or high-speed drive, the ECU 70 stops the fuel injection, whereby the fuel consumption is improved and the emission of harmful exhaust-gas components is reduced. Fuel-cut operation is terminated immediately when the engine speed Ne falls below a restoration speed for restarting the fuel supply or when the accelerator pedal is depressed.

With reference to FIG. 2, a control of the effective length of the intake manifold 21 performed by the induction control system 18 will be explained.

In the induction control system 18 shown in FIG. 2, a low-speed induction port having a long effective length and adaptable for low engine speed is constituted by the induction passages 18a, 18b and 18c when the induction control valve 18d is open, whereas a high-speed induction having a short effective length and adaptable for high engine speed is constituted by the induction passages 18a and 18c. The low-speed induction port is longer in length and is large in change in the cross-sectional shape due to the presence of the induction passage 18b as compared to those of the high-speed induction port. The low-speed induction port weakens the strength (stratified charging degree) of tumble flow generated by the intake air supplied to the combustion chamber 5 through this port, whereas the high-speed induction port strengthens the tumble flow of intake air supplied therethrough. In this manner, the tumble flow of intake air has its strength which varies depending on the effective length of the intake manifold 21 (the induction passage defined in the induction control system 18). The strength of the tumble flow affects a combustion state in the in-cylinder injection engine.

In the present embodiment, the induction control valve 18d is open/close-controlled by the ECU 70 (intake-passage length control means) in accordance with the operating state of the engine 1 to make the effective length of the induction passage adaptable for the fuel injection mode which is selected depending on the engine operating state, to thereby attain the tumble flow having a desired strength suitable for the selected injection mode.

The open/close control of the injection control valve 18d may be carried out in accordance with engine speed Ne and engine load Pe. Alternatively, the injection control valve 18d may be controlled to be opened and closed in association with the selection of fuel injection mode. In the case of interrelating the valve control with the injection mode selection in this manner, the map (FIG. 3) for injection mode selection may be also employed as a map for the control of the induction control valve, thereby moderating requirement to arithmetic ability and a required memory capacity of the ECU 70. The valve control based on the parameters Ne and Pe may be combined with the valve control linked with the injection mode selection.

More specifically, the open/close control of the induction control valve 18 at the time of engine operation in the respective fuel injection modes is carried out in the following manner.

When the engine 1 is in a particular low-speed high-load operating region (a low engine-speed zone of the open-loop region and a low engine-speed zone of the stoichio-feedback region) which corresponds to the hatched region A shown in FIG. 3, i.e., when the engine 1 is operated in the intake-stroke enrich-injection mode or in the intake-stroke stoichio-injection mode, the induction control valve 18d is caused to close, thereby increasing the effective length of the intake manifold 21 (the induction passage defined in the induction control system 18) to constitute the induction port adaptable for low engine speed. As a result, the supercharging effect of inertial induction is enhanced to improve the induction efficiency, resulting in an increased engine output torque.

When the engine 1 is operated in operating regions other than the hatched region A shown in FIG. 3, the induction control valve 18d is caused to be open, thereby decreasing the effective length of the intake manifold 21 to constitute the induction port adaptable for high engine speed. As a consequence, the engine 1 and the induction control system 18 functions as follows:

At the time of engine operation in the compression-stroke injection mode, the induction control valve 18d is caused to open to shorten the effective length of the intake manifold 21. The air supplied from the intake pipe 25 into the shortened intake manifold 21 is smoothly sucked into the combustion chamber 5, thereby generating a strong tumble flow of air in the cavity 8 which is formed at the top of the piston 7. The fuel injected at the timing in a latter stage of compression stroke is positively retained within the cavity 8 under the action of the strong tumble flow. As a result, a considerably rich air-fuel mixture is formed stably around the ignition plug 3 at the ignition timing. This makes it possible to stabilize a combustion of fuel, resulting in reduced emission of harmful exhaust-gas components and improved fuel consumption.

At the time of engine operation in the intake-stroke lean injection mode, the induction control valve 18d is caused to open, and hence an amount of intake air sucked into the combustion chamber 5 increases. As a consequence, the fuel injected into the combustion chamber 5 is permitted to be rapidly burnt, resulting in a stable combustion of uniform lean air-fuel mixture.

At the time of engine operation in the intake-stroke stoichio-injection mode, the induction control valve 18d is caused to open, and hence the combustion speed increases. Thus, the antiknock property is improved. This makes it possible to advance the ignition timing, thereby improving the fuel efficiency.

In case that the engine 1 is in a high-speed side zone of the open-loop region and is hence operated in the intake-stroke enrich injection mode, the induction control valve 18d is caused to be open, whereby the induction efficiency is improved and hence the engine torque increases.

In the following, a control apparatus according to a second embodiment of the present invention will be explained.

Figure 4:
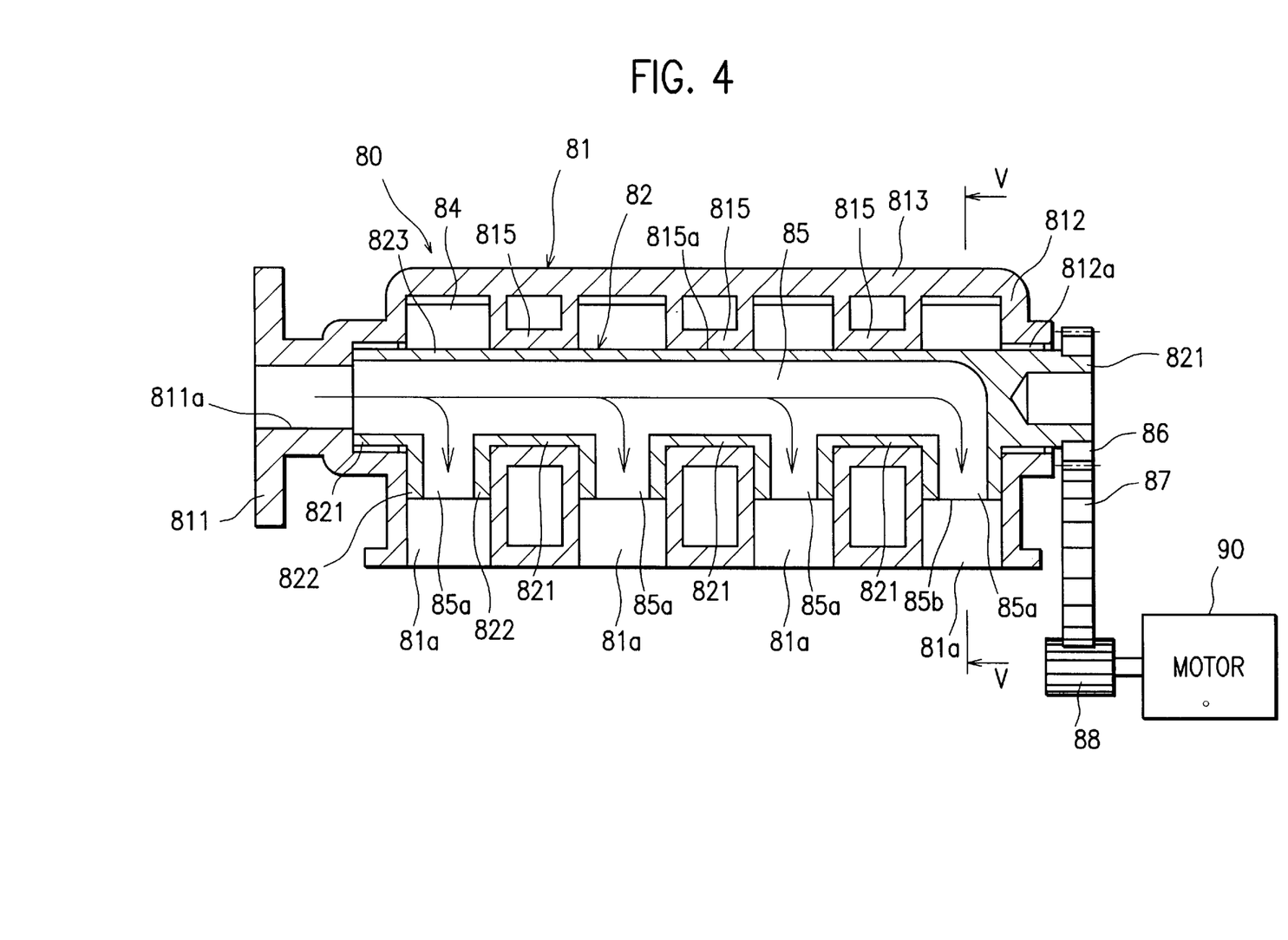
FIG. 4 is a schematic longitudinal sectional view showing an induction control system of a control apparatus according to a second embodiment of the present invention.
Figure 5:
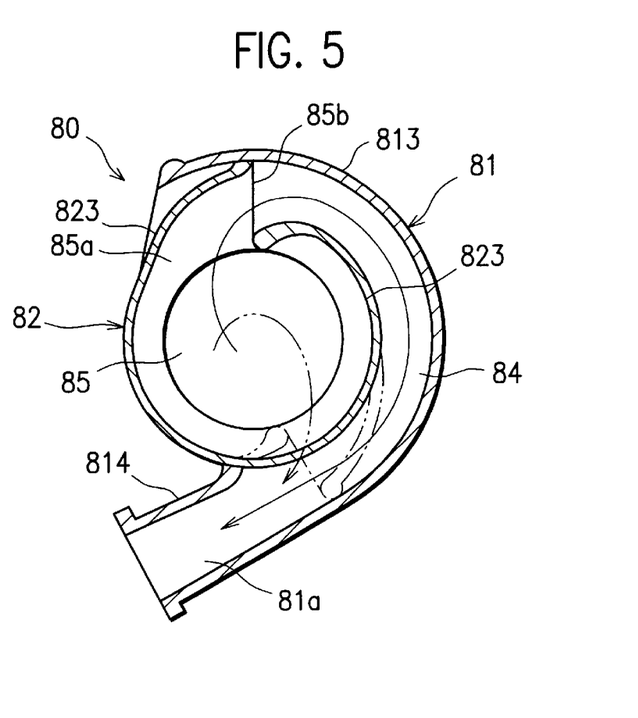
FIG. 5 is a schematic transverse sectional view showing, in a scale different from that of FIG. 4, the induction control system, taken along line V—V in FIG. 4.

The present embodiment is featured in that it operates to continuously vary the effective length of the intake manifold, as compared to the first embodiment in which the effective length of the intake manifold is changed in two stages. To this end, in the present embodiment, an induction control system 80 shown in FIGS. 4 and 5 is employed instead of the system shown in FIG. 2. Both the embodiments have the same arrangement in other respects.

As shown in FIGS. 4 and 5, the induction control system 80 is comprised of a stationary pipe 81 which is formed, as a whole, into a semi-cylindrical shape, and a cylindrical movable pipe 82 which is air-tightly rotatably received in the stationary pipe 81, and a driving section 86, 87, 88 and 90 for rotating the movable pipe 82.

The stationary pipe 81 includes a first side wall 811 formed with a through hole 811a, a second side wall 812 formed with a through hole 812a, an outer peripheral wall 814 which extends semi-circular as view in a transverse section (FIG. 5), and an inner wall disposed at a downstream side of the stationary pipe 81. The peripheral wall 813 has its inner peripheral face formed with partition walls 815 which correspond in number (e.g., three) to the number (e.g., four) of cylinders of the engine 1. These partition walls 815 extend circumferentially of the stationary pipe 81, are separated from each other longitudinally of the stationary pipe 81, and are formed with central holes 815a, having a semicircular shape in transverse cross-section, along the longitudinal axis of the stationary pipe 81.

The movable pipe 82 is comprised of five cylindrical portions 821 each of which is fitted in a corresponding one of the holes 811a, 812a and 815a respectively formed in the side and partition walls of the stationary pipe 81; eight annular partition plates 822 extending from the cylindrical portions 821 radially outwardly of the movable pipe along side faces of the partition walls 815 and inner end faces of the side walls 811 and 812 of the stationary pipe 81, and four peripheral walls 823 having a spiral shape in transverse cross-section (FIG. 5). The opposite end faces of each peripheral wall 823 are connected to radially outward edges of adjacent partition walls 822, so that these partition walls are connected with each other through the peripheral wall.

The inner peripheral faces of the cylindrical portions 821 cooperate with the inner peripheral face of the peripheral walls 823 of the movable pipe 82 to define an induction passage 85 which serves as a surge tank. Those longitudinal sections of the induction passage 85 which correspond to the peripheral walls 823 each have an inner diameter which is larger than that of those sections of the passage 85 which correspond to the cylindrical portions 823. In FIGS. 4 and 5, reference numeral 85a denote the large-diameter sections of the induction passage 85, and reference numeral 85b denotes an opening of the large-diameter portion 85a of the induction passage 85.

That cylindrical portion 821 of the stationary pipe 81 which is disposed on the side close to the first side wall 811 has its open end face through which the induction passage 85 is communicated with the interior of the intake pipe 25 of the engine 1, whereas that cylindrical portion on the side close to the second side wall 812 has its end face which is closed. These cylindrical portions are fitted in the holes 811a and 812a formed in the side walls of the stationary pipe 81, whereby the movable pipe 81 is rotatably supported by the stationary pipe 81.

The inner end faces of the side walls 811, 812, the side faces of the partition walls 815 and the inner peripheral faces of the peripheral walls 813 cooperate with the outer peripheral faces of the peripheral walls 823 of the movable pipe 82 to define induction passages 84 which correspond in number (e.g., four) to the engine cylinders. The respective large-diameter portions 85a of the induction passage 85 are communicated through the openings 85b with the induction passages 84 which are in turn communicated with four outlet ports 81c each defined, at the downstream side of the stationary pipe 81, by the peripheral wall, inner wall, and the associated two of the side and partition walls of the stationary pipe 81. The outlet ports 81c are connected with the intake ports 13 of the engine 1.

The driving section of the induction control system 80, which rotatably drives the movable pipe 82, includes a stepper motor 90 which operates under the control of the ECU 70 (intake-passage length control means). The movable pipe 82 is coupled to the output shaft of the motor 90 through a gear 86 mounted to the cylindrical portion 821 on the side close to the second side wall 812 of the stationary pipe 81, a gear 87 meshing therewith and a gear 88 mounted on the motor output shaft. The movable pipe 82 is rotated clockwise and counterclockwise in FIG. 5 within a limited angular range as the motor 90 rotates in the forward and reverse directions. The movable pipe 82 takes a rotary position shown by solid line in FIG. 5 when it is rotated up to a counterclockwise rotary limit, and takes a rotary position shown by broken line in FIG. 5 when rotated to a clockwise rotary limit.

In the induction control system 80, the induction passages 84 of the stationary pipe 81 constitute part of the intake manifold 21. The effective length of the induction passage 24 (more generally, the effective length of the entire intake passage 21, 25 defined in the induction system) varies in dependence on the rotary position of the movable pipe 82.

That is, the openings 85b of the induction passage 85 of the movable pipe 82 face a most-upstream part of the induction passage 84 of the stationary pipe 81, as shown by solid line in FIG. 5, when the movable pipe 82 is at its counterclockwise limit rotary position. Thus, the effective length of the induction passages 84 increases to a maximum.

At this time, the intake air supplied from the intake pipe 25 into the induction passages (surge tank) 85 of the movable pipe 82 flows into the induction passages 84 of the stationary pipe 81 and flows therethrough toward the outlet ports 81c, as shown by solid arrow in FIG. 5.

On the other hand, when the movable pipe 82 is at the clockwise limit, the openings 85b of the induction passage 85 of the movable pipe 82 face a most-downstream part of the induction passages 84 of the stationary pipe 81, as shown by two-dotted chain line in FIG. 5, so that the effective length of the induction passages 84 decreases to a minimum. The intake air flows from the induction passages 85 to the outlet ports 81c through the induction passages 84 having the minimum length, as shown by two-dotted chain arrow in FIG. 5.

The movable pipe 82 takes an arbitrary rotary position between the two rotary limits, so that the effective length of the induction passages 84 continuously changes in accordance with the rotary position of the movable pipe 82. As the effective length of the induction passages 84 becomes shorter, the strength of the tumble flow of intake air becomes stronger. Thus, when the engine 1 is operated in the fuel injection mode which requires a strong tumble flow, it is preferable to make the effective length of the induction passage 84 short.

With the induction control system 18 having the aforementioned construction and function, the effective length of the induction passages 84 (more generally, the effective length of the entire intake passage of the induction system) can be shortened to a value short enough to generate the tumble flow of intake air having a required strength, when the engine 1 is operated in the compression-stroke injection mode. In other words, even if the compression-stroke injection mode is selected, the effective length of the induction passages 84 can be made longer so long as the resultant tumble flow has a minimum strength required to prevent a degraded combustion. Thus, the volumetric efficiency (more generally, induction efficiency) can be improved by utilizing the supercharging effect of inertial induction, while preventing the stability of combustion from being worsened. The resultant increase in the amount of intake air sucked into the combustion chamber improves the thermal efficiency, and the resultant decrease in the exhaust-gas temperature reduces thermal loss. As a consequence, the engine output torque can be improved.

In the intake-stroke lean injection mode, the requirement in respect of the strength of tumble flow is relieved and hence the effective length of the induction passages 84 may be changed greatly, as compared to the case where the engine operates in the compression-stroke injection mode. For this reason, an improved volumetric efficiency can be obtained by means of the inertial supercharging effect, without causing an unstable combustion. The resultant increase in the amount of intake air provides an improved thermal efficiency. Further, the exhaust-gas temperature decreases and hence the thermal loss is reduced. As a result, the engine output can be increased.

In the stoichiometric air-fuel ratio mode, the requirement in respect of the strength of tumble flow is further relieved and hence the effective length of the induction passage 84 may be changed greatly, as compared to the intake-stroke lean injection mode. For this reason, it is possible to increase the engine output torque over the entire region where the engine is operated in the stoichiometric air-fuel ratio mode, especially, in the full-load engine operating region, by setting the effective length of the induction passages 84 to an optimum length suitable for the engine operating state.

In the enrich mode, the requirement in respect of the strength of tumble flow is further relieved and hence the effective length of the induction passage 84 may be changed greatly, as compared to the stoichiometric air-fuel ratio mode. This makes is possible to increase the torque over the entire region where the engine is operated in the enrich mode, especially, in the full-load engine operating region.

The present invention is not limited to the first and second embodiments, but may be modified in various manners. For example, an induction control system which constitutes part of the control apparatus of this invention may be of any type so long as it can vary the effective length of the intake passage of the induction system of the engine.

What is claimed is:

1. A control apparatus of an in-cylinder injection type internal combustion engine which is selectively operated in at least either a compression-stroke injection mode where fuel is injected in a compression stroke or an intake-stroke injection mode where the fuel is injected in an intake stroke of the engine, comprising:

an induction control system for changing an effective length of an intake passage through which air is introduced into a combustion chamber of the engine; and intake-passage length control means for operating said induction control system to change the effective length of the intake passage in accordance with the selected injection mode, said induction control system being operable, under control of the intake-passage length control means in the compression-stroke injection mode, to make the effective length of the intake passage shorter than that for the intake-stroke injection mode.

2. The control apparatus according to claim 1, further comprising:

operating state detecting mean for detecting an engine operating state;

wherein said induction control system operates, under the control of said intake-passage length control means, to change the effective length of the intake passage in accordance with the engine operating state detected by said operating state detecting means.

3. The control apparatus according to claim 1, wherein an amount of change in the effective length of the intake passage in the compression-stroke injection mode is set to a value of zero or less than that in the intake-stroke injection mode.

4. The control apparatus according to claim 1, further comprising:

load-related value detecting means for detecting a load-related value which interrelates with engine load;

wherein the intake-stroke injection mode is comprised, at least, of an enrich mode where the engine is operated with an air-fuel ratio which is richer than a stoichiometric air-fuel ratio and a stoichiometric air-fuel mode where the engine is operated with an air-fuel ratio equal to or close to the stoichiometric air-fuel ratio; and wherein the effective length of the intake passage is set to a length longer than that for the compression-stroke injection mode if the engine rotational speed is equal to or lower than a predetermined speed and if the load-related value is equal to or greater than a predetermined value in case that the enrich mode or the stoichiometric air-fuel ratio mode is selected.

* * * * *